Feb. 2, 1932. A. W. HENRY 1,843,422
AUTOMOTIVE VEHICLE FRAME
Original Filed Aug. 6, 1927
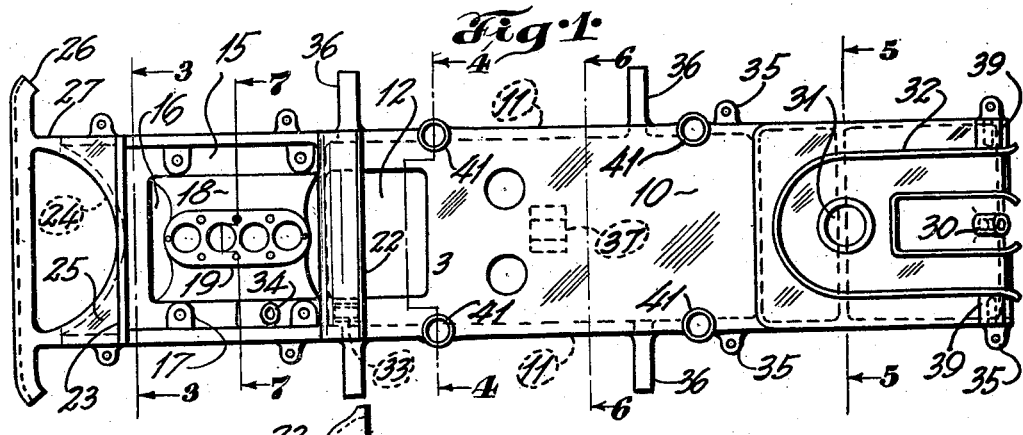
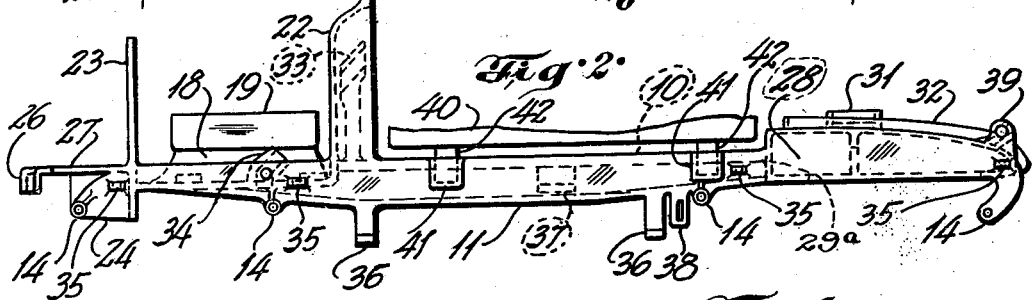
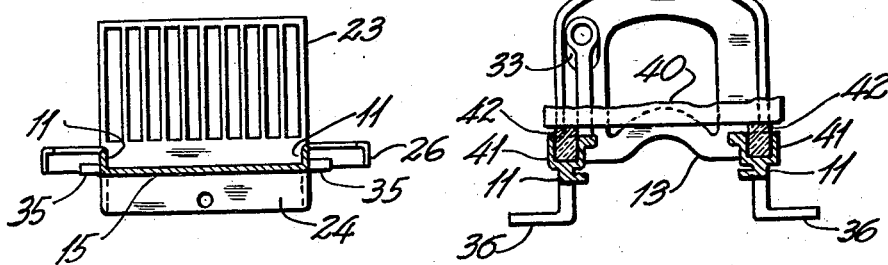
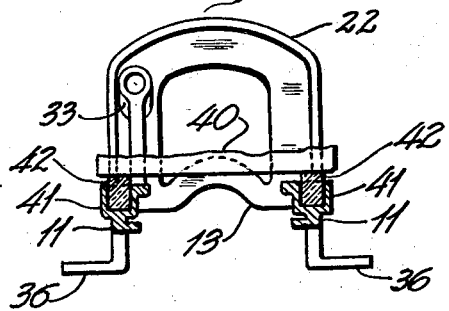
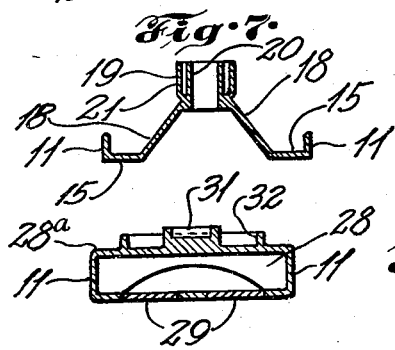
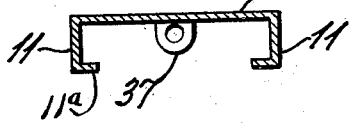
INVENTOR
Alfred W Henry Patented Feb. 2, 1932

1,843,422

UNITED STATES PATENT OFFICE

ALFRED W. HENRY, OF ST. LOUIS, MISSOURI

AUTOMOTIVE VEHICLE FRAME

Application filed August 6, 1927, Serial No. 211,032. Renewed June 29, 1931.

This invention relates to improvements in automotive vehicle frames, and more particularly to an automotive vehicle frame comprising a one piece casting, and associated therewith an improved body mounting means, and has, among others, the following objects:

To provide a unitary structure embodying all the essential elements of a frame; to provide a structure wherein the elements thereof are integrally connected; to provide a frame with the chemical and physical structure of the material uniform throughout; to provide a unitary construction of a frame and engine cylinder block; to provide a unitary construction of a frame and a liquid container, such as a fuel tank; to provide an improved frame structure embodying means for resiliently mounting an automotive body thereon; to provide an improved automotive vehicle structure incorporating a body resiliently supported by a frame; to provide an improved form of construction of an automotive frame wherein the elements associated therewith act also to stiffen and strengthen the frame; to provide a tractor truck frame having means for connecting a trailer truck thereto incorporated integrally therewith in a new and novel manner; to provide a frame construction having a minimum number of elements or parts by forming said elements integrally with the frame whereby said elements stiffen and strengthen the frame; to provide a frame simple to manufacture and inexpensive in upkeep; and also to provide other improvements and advantages as will appear hereinafter.

With the above and other objects in view, my invention consists in the combination and arrangement of parts hereinafter described and claimed and more particularly illustrated in my preferred embodiment as shown in the accompanying drawings, wherein is shown the preferred embodiment of the invention. However, it is to be understood that the invention comprehends changes, variations and modifications which come within the scope of the claims hereunto appended.

Figure 1 is a plan view of an automotive vehicle frame embodying my invention;

Figure 2 is a side elevation of Figure 1;

Figure 3 is a sectional view along the line 3—3 of Figure 1;

Figure 4 is a sectional view along the line 4—4 of Figure 1;

Figure 5 is a sectional view along the line 5—5 of Figure 1;

Figure 6 is a sectional view along the line 6—6 of Figure 1;

Figure 7 is a sectional view along the line 7—7 of Figure 1.

In the construction of automotive vehicle frames, the usual and customary construction embodies side members and transverse stiffening members, mechanism supporting members and associated parts, and various appended and attached parts adapted to usefully function in the use and employment of the automotive unit, the said members and parts and mechanisms associated therewith being formed more or less separately of one another and bolted, riveted or welded together to form the completed automotive vehicle frame unit or structure.

In the use of such a structure, the racking and weaving inherent in the use and employment of the automotive vehicle unit will naturally have a tendency to destroy the fastening means or bonds whereby the parts are caused to coact with one another, whereby the frame becomes unfit to perform its proper function of alining and supporting the mechanisms associated therewith.

My invention consists in incorporating the side members, transverse stiffening members, mechanism supporting members and associated parts, and also the various appended and attached members employed in connection with the frame structure, in a unitary or integral structure, as by providing the same in a one-piece casting, the chemical and physical structure of the material being uniform throughout.

I also have found that, by employing a one-piece casting, I am able to incorporate new and useful constructions in the same, such as casting the cylinder block and the upper half of the crank case integrally with the frame; and further, I cast the usual fuel container integrally with the frame and also utilize the resulting structure to form a platform means or supporting means for connecting a trailer truck or like device to the automotive unit having my improved frame construction incorporated therein.

I have also found that the said racking and weaving of the usual frame, aside from the deleterious effect upon the mechanism mounted on the frame, also seriously affects the body of the automotive unit, so that frequently the body is rendered unfit for use long before other parts of the automotive unit are worn out. I have therefore provided, in connection with my improved frame construction, a new and novel means of resiliently mounting the said body upon the frame, so as to practically prevent the racking and weaving of the frame from being communicated to the body, whereby I greatly prolong the useful life of the body.

Referring now more particularly to the drawings, it will be seen that I provide an automotive vehicle frame structure embodying a one piece casting forming a horizontal girder of channel shaped cross section, as clearly shown in Figure 6. I provide the said girder with an upper horizontal substantially continuous web 10, and depending flanges 11 along the side edges of web, said flanges being provided along their lower edges with laterally extending inturned members 11ª, as shown in Fig. 6.

The web of the girder is approximately coextensive with and serves to transversely stiffen the frame, and apertures or openings 12 are provided as required in the web for the reception of the automotive mechanism usually employed. In addition, transverse stiffening elements 13 may be extended across the aperture 12 and connecting the flanges 11, and the said stiffening elements 13 may also serve as automotive mechanism supporting elements.

The flanges 11 of the girder form the usual side members of an automotive vehicle frame, and in this case also form longitudinal spring receiving elements as by spring hangers 14 extended from the lateral members 11ª.

In that portion of the frame wherein is usually positioned the engine or other motivating means of the automotive unit, and in connection with the aperture 12, I provide a dust pan or engine protecting means 15, as shown in Figure 3. This dust pan extends laterally from the inturned members 11ª, and is provided with an aperture 16, whereby the engine or other mechanism may be mounted upon the supporting brackets or like means 17 associated with said aperture 16, (Figure 1).

In my preferred embodiment, however, I form the crankcase side walls 18 by extending the members 11ª upwardly through the aperture 16 and the engine cylinder block 19 integrally united the said walls 18, as shown in Figure 1 and Figure 7, the lower half of the crankcase (not shown) being removably attached to the dust pan or laterally extended portions 11ª 15 of side members.

As shown in Figure 7 in my preferred embodiment I form the cylinder walls 20 integrally with the water jacket walls 21, but of course, the cylinder walls may be omitted from the casting and inserted as liners in the cylinder block, at the option of the person constructing the device.

In the usual construction a cowl is mounted on the body which in turn is mounted on the frame, but in my invention I form a cowl element 22 integrally with the frame, (Figure 4), and in this manner I obtain the use of a cowl structure in the customary manner, and also provide a stiffening member for the frame of great practical utility. As will be seen in Figure 4, this cowl element 22 may be combined with a mechanism supporting element, as in 13, the whole forming a truss like structure connected to the side members 11 of the frame in such a manner as to strongly resist any tendency of the frame to rack or weave.

In a like manner, and for a like purpose, I form a radiator guard 23 combined with the apron or mud guard 24, the radiator guard including upstanding vertical members connected at their upper ends and the whole being integrally connected to the dust pan 15 and the side members 11, the said mud guard being also formed in an arcuate shape, and depending from integrally formed gusset elements 25, whereby I not only stiffen the frame against vertical movement but also effectually prevent horizontal movement of one side of the frame relatively to the other, this construction being particularly desirable in view of the engine receiving element 12 aforesaid, which has a tendency to weaken the structure in the vicinity of said element or aperture.

As a further precaution against racking movements of the front end of the frame, I provide a buffer element 26 integrally formed with the prolongations 27 of the side members 11 of the frame, which serves the double purpose of strengthening the frame at this point and of forming an effectual means to receive and withstand any shocks and blows encountered by reason of collisions or the like. Of course a like buffer element may be provided at the rear end of the frame, at the option of the person constructing the same.

It is customary to provide fuel containing means in connection with automotive structures, which are attached to but not incorporated with the frame; by the construction shown in Figure 5, I provide such a fuel or other liquid container means in a very simple and effective manner. The rearward portion of the web is offset vertically as at 28ª and the corresponding opposite lateral members 11ª are connected beneath said offset web portion as at 29 to form an enclosure 28 therebetween. The enclosure is completed by a suitable partition 29ª at its front, and at its rear by inclining the upper wall 28ª to connect with the lower wall 28. I also cast a filling spout 30 in the top of the container.

In the embodiment shown, I utilize the liquid container structure above described in a new and novel manner, as by casting a center plate 31, on the top wall 28ª, said top wall having a tracking surface 32, said tracking surface being concentric with the forward half of the center plate and extending rearwardly therefrom.

As will be readily seen from the drawings, I incorporate a steering mechanism support 33 with one of the side members of the frame, the said support being spaced from the cowl element 22, and by this means I provide a means of supporting the steering column independently of the cowl or associated parts, in the event that I may desire to omit the said cowl element as an integral part of the frame structure. I also provide a steering mechanism bracket 34, on one of the side members. The said support and bracket have alined apertures for receiving a steering column (not shown). In addition, I incorporate with the frame, fender-supporting or engaging elements 35, running board supporting brackets 36, a torque tube receiving element 37, radius rod receiving elements 38, and dump body pivot brackets 39, cast integrally with the frame.

In my preferred embodiment I do not mount the body 40 rigidly on the frame, but support the body resiliently on the frame, as by providing buffer pockets or elements 41, in the side members of the frame, said pockets opening upwardly through the web 10 and being located at the junction of the web and the side members, and mounting resilient elements or buffers 42, therein, and I mount or attach the body upon the said buffers 42, in such a manner as to cause the same to be spaced from the frame and therefore incapable of directly receiving any shocks or blows therefrom, all such shocks or blows being practically absorbed by the resilient buffers 42.

In this manner I prevent the racking and weaving of the frame from being communicated to the body.

I construct my improved automotive vehicle frame with the chemical and physical structure of the material uniform throughout, and preferably employ a chemical composition of the material as follows:—carbon, 0.15% to 0.25%; manganese 0.70% to 0.80%; silicon, 0.05% to 0.10%; nickle 0.05% to 0.15%; chromium 0.05% to 0.15%; sulphur 0.05% or less; phosphorous 0.05% or less and iron to make 100%. In employing a material of the aforesaid composition I fuse the same to a suitable fluid condition, which I obtain at a temperature of 4,000 degrees Fahrenheit and cast the same in a suitable form; when the material has solidified and cooled I anneal the same at a temperature of 1,500 degrees Fahr., thereby obtaining a material having a tensile strength of 70,000 pounds to the square inch.

It will be seen that I obtain a homogeneous structure having a high tensile strength which is also weldable and highly ductile, and by reason of the aforesaid combination of qualities of the material in the frame structure resulting from the process described, I am able to employ a form of construction in my improved frame which will be light in weight, strong and durable in use, and having the strength of the various portions thereof exactly proportioned to the stresses and strains set up therein when in use.

It will be readily seen, from the foregoing description of my invention, that I obtain the objects and advantages set forth hereinbefore; that a frame as described will have a useful life of long duration, and that an automotive unit embodying my invention will have practical utility far exceeding the forms of construction heretofore employed.

I claim:—

1. An automotive vehicle frame formed from a single piece of metal including a horizontal web member substantially continuous with the frame and coextensive with the width of the frame, longitudinally extending spring receiving flange members depending from each side of said web member, and inturned lateral members extending continuously along and connected to the lower edges of said flange members, a portion of said web member being apertured, and the corresponding opposite portions of said lateral members being extended upwardly through said aperture and united to form an engine block.

2. In an automotive vehicle frame an integral structure including a side member extending approximately from end to end of said frame, a steering mechanism bracket formed integral with and extending from the inner face of said side member and a steering mechanism support integrally connected to and upstanding from said side member, said bracket and support having alined apertures for receiving a steering column.

3. In an automotive vehicle frame an integral structure including spaced forwardly extending spring receiving members, a horizontal web member connecting said spring receiving members, said web member having an arcuate concave edge, a flange depending from said arcuate edge, said flange also connecting said spring receiving members, and a transverse bumper member connecting the opposite ends of said arcuate edge.

4. An automotive vehicle frame comprising a one piece casting forming a horizontal channel shaped girder, the flanges of the girder projecting horizontally beyond the web of the girder and being laterally extended at their projected ends to form a bumper element, gusset members connecting the web of the girder and said projected ends, spring receiving elements depending from said projected ends, and a flange depending from the gusset members and connecting said spring receiving elements.

5. An automotive vehicle frame formed of a single piece of metal including a horizontal web plate extending approximately over the rear half of said frame, longitudinally extending spring receiving members depending from each side of said web member, said flange members being provided along their lower edges with laterally extending members, the forward portions of said lateral members being extended upwardly and inwardly and united to form an engine block, a steering mechanism bracket formed on one of said lateral members, a steering mechanism support upstanding from said web member, said bracket and said support having alined apertures for receiving a steering column, a spring engaging member depending from each of said lateral members, buffer pockets opening upwardly through said web member, said pockets being respectively disposed above one of said spring engaging members and formed in said longitudinal members at the junction thereof with said web member, the portion of said web member rearwardly of said buffer pockets being offset upwardly, the corresponding opposite portions of said lateral members being united beneath said offset portion to form an enclosure therebetween, a center bearing formed on the upper side of said offset web portion, said offset web portion having a tracking surface concentric with the forward half of said center bearing and extending rearwardly therefrom, upstanding walls bounding said tracking surface, and a body support including resilient members engaging said buffer pockets.

6. An automotive vehicle frame formed from a single piece of cast metal including an approximately horizontal web member extending substantially from end to end of the frame, a portion of said web member being coextensive with the width of the frame, longitudinally extending flange members depending from each side of said web member, and inturned lateral flange members extending along and integrally connected to the lower edges of said depending flange members, said inturned lateral flange members being provided with spring receiving elements near the ends of said frame, and said inturned flange members being continuous from one of said spring receiving elements to another, so as to serve as tension members in supporting the load between said spring receiving elements.

7. An automotive vehicle frame formed from a single piece of cast metal including an approximately horizontal web member extending substantially from end to end of the vehicle frame, a portion of said web member being coextensive with the width of the frame, longitudinally extending flange members depending from each side of said web member, and inturned lateral flange members extending along and integrally connected to the lower edges of said depending flange members, portions of said lateral flange members being extended near the ends of the frame to form spring receiving elements, and said lateral flange members being continuous from one of said spring receiving elements to another, so as to serve as tension members in supporting the load between said spring receiving elements.

ALFRED W. HENRY.